US012602917B2

(12) United States Patent
Lin et al.

(10) Patent No.: US 12,602,917 B2
(45) Date of Patent: Apr. 14, 2026

(54) OBJECT DETECTION DEVICE AND METHOD

(71) Applicant: Wistron Corp., New Taipei City (TW)

(72) Inventors: Zhe-Yu Lin, New Taipei City (TW); Chih-Yi Chien, New Taipei City (TW); Chen Wei Yang, New Taipei City (TW); Tsun-Hsien Kuo, New Taipei City (TW); Kuei Ping Ting, New Taipei City (TW); Ke Kang Chen, New Taipei City (TW)

(73) Assignee: WISTRON CORP, New Taipei City (TW)

( * ) Notice: Subject to any disclaimer, the term of this patent is extended or adjusted under 35 U.S.C. 154(b) by 344 days.

(21) Appl. No.: 18/191,202

(22) Filed: Mar. 28, 2023

(65) Prior Publication Data

US 2024/0203112 A1 Jun. 20, 2024

(30) Foreign Application Priority Data

Dec. 19, 2022 (TW) .................................. 111148672

(51) Int. Cl.
| | |
|---|---|
| *G06V 10/82* | (2022.01) |
| *G01J 5/00* | (2022.01) |
| *G06T 7/55* | (2017.01) |

(52) U.S. Cl.
CPC ............ G06V 10/82 (2022.01); G01J 5/0022 (2013.01); G06T 7/55 (2017.01)

(58) Field of Classification Search
CPC ........ G06V 10/82; G06V 20/52; G06V 20/56; G06V 20/70; G06V 20/64; G06V 20/50; G01J 5/0022; G06T 7/55; G06T 7/50
See application file for complete search history.

(56) References Cited

U.S. PATENT DOCUMENTS

| | | | |
|---|---|---|---|
| 2012/0041593 A1* | 2/2012 | Ichinose | ............... B66B 1/2458 |
| | | | 700/258 |
| 2019/0340775 A1 | 11/2019 | Lee | |
(Continued)

FOREIGN PATENT DOCUMENTS

| | | |
|---|---|---|
| CN | 205397758 U | 7/2016 |
| CN | 111874764 A | 11/2020 |
(Continued)

OTHER PUBLICATIONS

CN111874764, machine translated (Year: 2021).*
(Continued)

*Primary Examiner* — Jianxun Yang
(74) *Attorney, Agent, or Firm* — McClure, Qualey & Rodack, LLP

(57) ABSTRACT

An object detection device is provided in the invention. The object detection device includes an image-extraction device and a processor. The image-extraction device extracts a plurality of images and a plurality of depth images in a specific space, wherein each image corresponds to one of the depth images. The processor may detect objects in each image using an object detection model to obtain object information. The processor may calculate the depth value of each object in each depth image. The processor may input the depth value of each object into an object status model to determine the object status of each object. The processor may determine whether to enter the specific space based on the object information and the object status of each object. Therefore, the object detection device provided in the invention will be able to determine a suitable time to enter the specific space.

16 Claims, 4 Drawing Sheets

(56)                  References Cited

U.S. PATENT DOCUMENTS

| | | |
|---|---|---|
| 2021/0053795 A1 | 2/2021 | Ko |
| 2021/0255304 A1 * | 8/2021 | Fontijne ................. G06V 20/10 |
| 2021/0375062 A1 | 12/2021 | Fleischman |

FOREIGN PATENT DOCUMENTS

| | | | |
|---|---|---|---|
| CN | 112347876 A | 2/2021 | |
| CN | 112408131 A | 2/2021 | |
| CN | 114913460 A | 8/2022 | |
| EP | 3882198 A1 * | 9/2021 | .............. B66B 1/28 |
| JP | 2005-018382 A | 1/2005 | |
| JP | 2021-523443 A | 9/2021 | |

OTHER PUBLICATIONS

Japanese language office action dated May 7, 2024, issued in application No. JP 2023-119226.
English language translation of office action dated May 7, 2024.
Extended European Search Report dated May 15, 2024, issued in application No. EP 23181451.8.
Japanese language office action dated Nov. 12, 2024, issued in application No. JP2023-119226.
English language translation of office action dated Nov. 21, 2024.
Chinese language office action dated Jun. 21, 2023, issued in application No. TW 111148672.

* cited by examiner

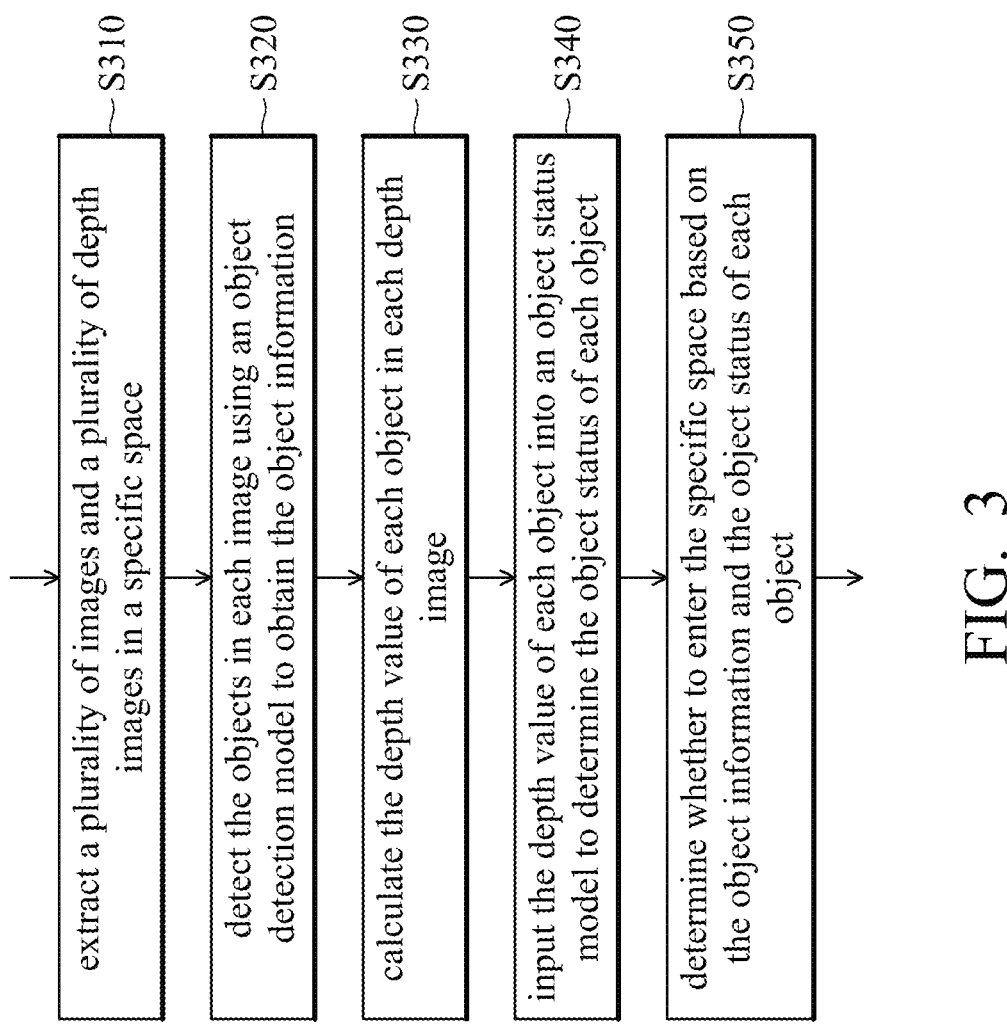

extract a plurality of images and a plurality of depth images in a specific space ~S310 detect the objects in each image using an object detection model to obtain the object information ~S320 calculate the depth value of each object in each depth image ~S330 input the depth value of each object into an object status model to determine the object status of each object ~S340 determine whether to enter the specific space based on the object information and the object status of each object ~S350

FIG. 3

OBJECT DETECTION DEVICE AND METHOD

CROSS REFERENCE TO RELATED APPLICATIONS

This Application claims priority of TW Patent Application No. 111148672 filed on Dec. 19, 2022, the entirety of which is incorporated by reference herein.

BACKGROUND OF THE INVENTION

Field of the Invention

The invention generally relates to object-detection technology, and more particularly, to object-detection technology that determines whether an object detection device enters a specific space.

Description of the Related Art

As technology has progressed, Autonomous Mobile Robots (AMR) are being applied more widely.

When the AMR needs to be applied in item delivery service (e.g., autonomous food delivery) in a building, the AMR may need to deliver items to each floor by taking the elevator. However, before the AMR enters an elevator, a wheelchair, a stroller, or a shopping cart may have been in the elevator. Because the large size of the AMR, if the AMR waits directly in front of the elevator door, or if it directly enters the elevator, bigger objects (e.g., the wheelchair or stroller) may not be able to get out of the elevator smoothly.

Therefore, how to assist the AMR to determine a suitable time to enter an elevator is a subject which is worthy of discussion.

BRIEF SUMMARY OF THE INVENTION

An object detection device and method are provided to overcome the problems mentioned above.

An embodiment of the invention provides an object detection device. The object detection device may comprise an image-extraction device and a processor. The image-extraction device may extract a plurality of images and a plurality of depth images in a specific space, wherein each image corresponds to one of the depth images. The processor is coupled to the image-extraction device to obtain the images and the depth images from the image-extraction device. The processor may detect objects in each image using an object detection model to obtain object information. The processor may calculate the depth value of each object in each depth image. The processor may input the depth value of each object into an object status model to determine the object status of each object. The processor may determine whether to enter the specific space based on the object information and the object status of each object.

An embodiment of the invention provides an object detection method. The object detection method may be applied to an object detection device. The object detection method comprises the following steps. An image-extraction device of the object detection device may extract a plurality of images and a plurality of depth images in a specific space, wherein each image corresponds to one of the depth images. Then, a processor of the object detection device may detect objects in each image using an object detection model to obtain object information. Then, the processor may calculate the depth value of each object in each depth image. Then, the processor may input the depth value of each object into an object status model to determine the object status of each object. Then, the processor determines whether to enter the specific space based on the object information and the object status of each object.

Other aspects and features of the invention will become apparent to those with ordinary skill in the art upon review of the following descriptions of specific embodiments of an object detection device and method.

BRIEF DESCRIPTION OF THE DRAWINGS

The invention will become more fully understood by referring to the following detailed description with reference to the accompanying drawings, wherein:

FIG. 3 is a flow chart illustrating an object detection method according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
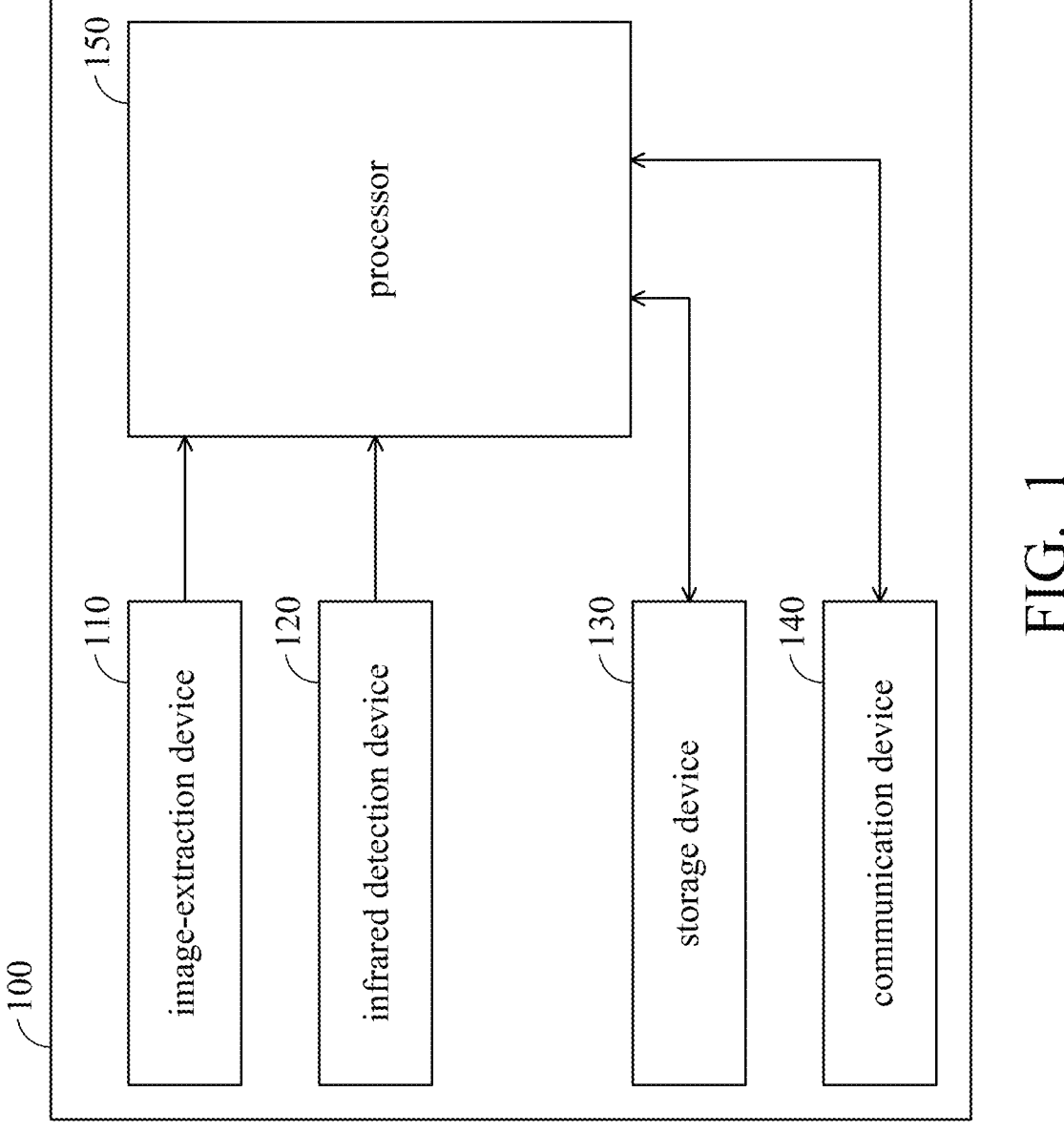
FIG. 1 is a block diagram of an object detection device 100 according to an embodiment of the invention.

FIG. 1 is a block diagram of an object detection device 100 according to an embodiment of the invention. According to an embodiment of the invention, the object detection device 100 may be an Autonomous Mobile Robot (AMR). As shown in FIG. 1, the object detection device 100 may comprise an image-extraction device 110, an infrared detection device 120, a storage device 130, a communication device 140 and a processor 150. It should be noted that FIG. 1 presents a simplified block diagram in which only the elements relevant to the invention are shown. However, the invention should not be limited to what is shown in FIG. 1. The object detection device 100 may also comprise other elements, e.g. a drive device of driving the motion of the AMR, a transmission mechanism, a motor or a wheel. The drive device may drive the AMR moving forward or back based on the indication of the processor 150.

Figure 2B:
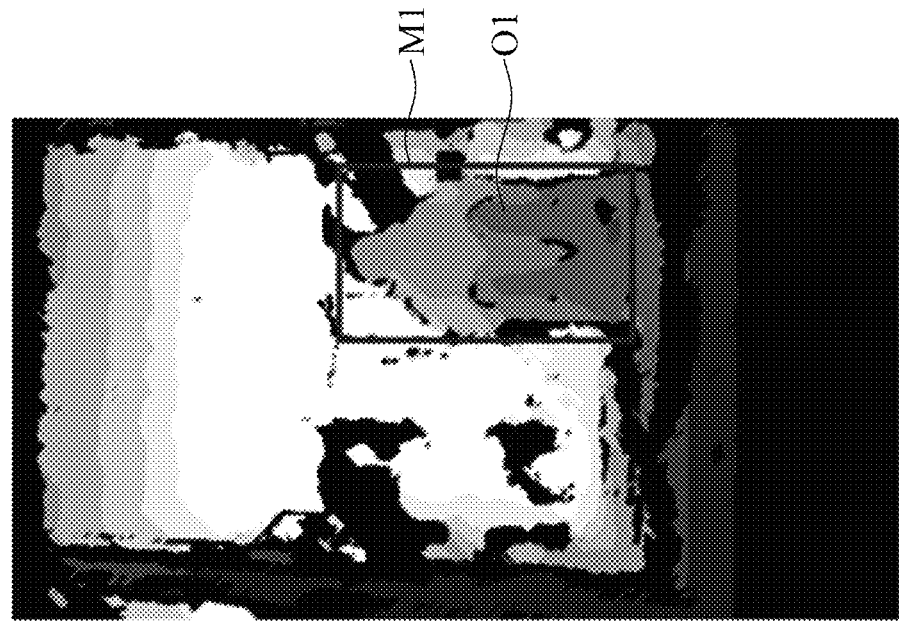
FIG. 2B is a schematic diagram of a depth image according to an embodiment of the invention.
Figure 2A:
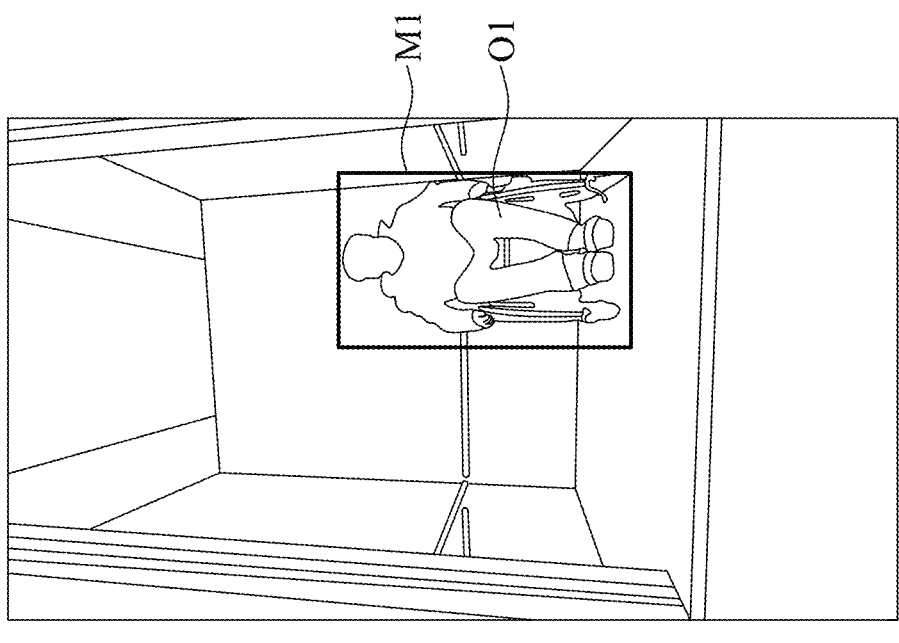
FIG. 2A is a schematic diagram of an image according to an embodiment of the invention.

According to the embodiments of the invention, the image-extraction device 110 may be a camera or other electronic device with shooting function. The image-extraction device 110 may extract the images in a specific space (e.g., in an elevator) in a specific period of time (e.g., Is) to generate a specific number of images and depth images. For example, when the door of the elevator opens, the image-extraction device 110 may photo the interior of the elevator to generate 30 continuous images and 30 continuous depth images every 1 second (i.e., the specific time). It should be noted that the invention should not be limited by the above example. In the embodiments of the invention, each image may correspond to one depth image. Taking FIG. 2A and FIG. 2B as an example, the image of FIG. 2A may correspond to the depth image of FIG. 2B.

According to the embodiments of the invention, the infrared detection device 120 may using infrared to detect whether there is any obstacle around the object detection device 100. For example, in response to that the infrared detection device 120 detects an obstacle around the object detection device 100, or in response to that the infrared detection device 120 detects an object approaching the object detection device 100, the processor 150 tells the object detection device 100 to stop moving and to generate a warning sound or a warning signal.

According to the embodiments of the invention, the storage device 130 may store the software and firmware program codes, system data, user data, etc. of the object detection device 100. The storage device 130 may be a volatile memory (e.g. Random Access Memory (RAM)), or a non-volatile memory (e.g. flash memory, Read Only Memory (ROM)), a hard disk, or a combination of the above memory devices.

According to the embodiments of the invention, the communication device 140 may communicate with a control device of a specific space (e.g., elevator). The communication device 140 may receive the wireless signals (e.g., Bluetooth signals or Wi-Fi signals, but the invention should not be limited thereto) from the control device of the specific space to determine whether the elevator door is opened or is closed. In response to the signal indicating that the elevator door is opened, the object detection device 100 may perform the object detection operations to determine whether to enter the elevator. In response to the signal indicating that the elevator door is closed, the object detection device 100 may stop performing the object detection operations and waits to receive the next signal indicating that the elevator door is opened from the elevator.

According to the embodiments of the invention, the processor 150 may control the operations of the image-extraction device 110, the infrared detection device 120, the storage device 130 and the communication device 140. According to an embodiment of the invention, the processor 150 may also be arranged to execute the program codes of the software modules to perform the object detection operations. The program codes accompanied by specific data in a data structure may also be referred to as a processor logic unit or a stack instance when being executed. Therefore, the processor 150 may be regarded as being comprised of a plurality of processor logic units, each for executing one or more specific functions or tasks of the corresponding software modules. According to an embodiment of the invention, the processor may be a central processing unit (CPU), a controller or a control chip, but the invention should not be limited thereto.

According to an embodiment of the invention, after the object detection device 100 obtains a specific number (e.g., 30) of images and depth images in a specific space (e.g., in an elevator) in a specific period of time (e.g., Is), the object detection device 100 may detects the objects in each image using an object detection model to obtain the object information. The depth images may also have the depth information corresponding to the object information. The object information may comprise the types of objects in each image, e.g. human, wheelchair, stroller, cart, and so on. The object information may comprise the position of each object in the image (i.e., the position of the object in the specific space). According to an embodiment of the invention, the object detection model may be a You Only Look Once (YOLO) model or a Region Convolutional Neural Network (R-CNN) model, but the invention should not be limited thereto. In addition, the object detection device 100 may track the same object in each image based on an object tracking algorithm to make sure that the objects detected in each image generated in the specific period of time (e.g., Is) are the same objects. According to an embodiment of the invention, based on the object tracking algorithm, the object detection device 100 may calculates the distances between the objects in the first image and the objects in the second image, and then the object detection device 100 may regard the object in the first image and the object in the second image with the shortest distance as the same object.

According to an embodiment of the invention, the object detection device 100 may calculate the depth value corresponding to each object in the depth images. Specifically, the object detection device 100 may calculate the depth matrix of each object in the depth image. Taking FIGS. 2A-2B as an example, when the object detection device 100 detects an object O1, the object detection device 100 may use a frame M1 to frame the object O1. The depth values corresponding to the frame M1 may be the depth matrix corresponding to the object O1. Then, the object detection device 100 may put the depth values of the depth matrix in sequence and select a specific range of depth values from the ordered depth values of the depth matrix (e.g., it may select a specific proportion of depth values from the middle part of the ordered depth values) to calculate the average of the selected depth values as the depth value corresponding to the object. Accordingly, the object detection device 100 may obtain the depth value of each object in the depth images. For example, if a depth matrix corresponding to an object in a depth image is a 5×5 matrix as follows:

$$
\begin{array}{l}
1 \\
2 \\
3 \\
4 \\
5 \\
6 \\
7 \\
8 \\
9 \\
10 \\
11 \\
12 \\
13 \\
14 \\
15 \\
16 \\
17 \\
18 \\
19 \\
20 \\
21 \\
22 \\
23 \\
24 \\
25
\end{array}
$$

After the object detection device 100 puts the depth values of the depth matrix in sequence, the depth values of the depth matrix may be changed to $\{1, 2, 3, 4, 5, 6, 7, 8, 9, 10, 11, 12, 13, \ldots, 25\}$. Then, the object detection device 100 may select the depth values in the $30^{th}\%\text{--}60^{th}$ (i.e., the specific range) of the ordered depth values (i.e., select $\{8, 9, 10, 11, 12, 13, 14, 15\}$) and take the average of the selected depth values (i.e., $(8+9+10+11+12+13+14+15)/8=11.5$) to obtain the depth value (i.e., 11.5) corresponding to the object. It should be noted that the above example is only used to illustrate the embodiment of the invention, but the invention should not be limited thereto. Because the frame corresponding to the object may frame some background noise, the background noise in the frame can be filtered through the above scheme of obtaining depth value of object.

According to an embodiment of the invention, after the object detection device 100 obtains the depth value of each object in the specific period of time, the object detection device 100 may input the depth value of each object into an object status model to determine the object status of each object. According to an embodiment of the invention, the object status may comprise that the object leaves the specific space (e.g., elevator) or the object stays in the specific space (e.g., elevator). In addition, according to an embodiment of the invention, the object status model may be, for example, a Recurrent Neural Network (RNN) model or a Long Short Term Memory (LSTM) model, but the invention should not be limited thereto. For example, if the depth values of an object in the specific period of time are {20, 20, 19, 18, 17, 17, 15, 13, 13, 12}, when the object detection device 100 inputs the depth values of the object into the LSTM model, the object detection device 100 may know that the object leaves the specific space (e.g., elevator). It should be noted that the above example is only used the embodiment of the invention, but the invention should not be limited thereto.

According to an embodiment of the invention, the object detection device 100 may determine whether to enter the specific space (e.g., elevator) based on the object information and the object status of each object. Specifically, the object detection device 100 may determine whether the objects comprise at least one specific object (e.g., wheelchair, stroller or cart) based on the object information first.

In response to that the objects comprise at least one specific object, the object detection device 100 may move back a distance to let the specific object (e.g., a wheelchair, stroller, or cart) has enough space to leave the specific space (e.g., an elevator). Then, the object detection device 100 may continuously monitor whether the specific object has left the specific space (i.e., the object detection device 100 may continuously monitor the object status of the specific object every specific period of time). In response to that the specific object has not left the specific space, the object detection device 100 may determine not to enter the specific space. In response to that the specific object has left the specific space, the object detection device 100 may further determine whether the number of objects (e.g., the number of persons) in the specific space is over the threshold (e.g., 5 persons, but the invention should not be limited thereto). In response to that the number of objects in the specific space is over the threshold, the object detection device 100 may also determine not to enter the specific space. In response to that the number of objects in the specific space is not over the threshold, the object detection device 100 may determine to enter the specific space.

In response to that the objects do not comprise any specific object, the object detection device 100 may further determine whether the number of objects (e.g., the number of persons) in the specific space is over the threshold (e.g., 5 persons, but the invention should not be limited thereto). In response to that the number of objects in the specific space is over the threshold, the object detection device 100 may also determine not to enter the specific space. In response to that the number of objects in the specific space is not over the threshold, the object detection device 100 may determine to enter the specific space.

In response to that the object detection device 100 determines there are no objects in the specific space based on the object information, the object detection device 100 may determine to enter the specific space, or the object detection device 100 may first wait a specific period of time, and then enter the specific space. In response to that the specific space is closed (e.g., the elevator door is closed), the object detection device 100 may stop performing the object detection operations and stay in its original position to wait until the specific space is opened again (e.g., the elevator door is opened again).

FIG. 3 is a flow chart illustrating an object detection method according to an embodiment of the invention. The flow of FIG. 3 can be applied to the object detection device 100. As shown in FIG. 3, in step S310, the object detection device 100 may extract a plurality of images and a plurality of depth images in a specific space, wherein each image may respectively correspond to one of the depth images.

In step S320, the object detection device 100 may detect the objects in each image using an object detection model to obtain the object information. According to an embodiment of the invention, the object detection model may be a You Only Look Once (YOLO) model or a Region Convolutional Neural Network (R-CNN) model, but the invention should not be limited thereto.

In step S330, the object detection device 100 may calculate the depth value of each object in each depth image.

In step S340, the object detection device 100 may input the depth value of each object into an object status model to determine the object status of each object. According to an embodiment of the invention, the object status model may be a Recurrent Neural Network (RNN) model or a Long Short Term Memory (LSTM) model, but the invention should not be limited thereto.

In step S350, the object detection device 100 may determine whether to enter the specific space based on the object information and the object status of each object. In an embodiment, the object detection device 100 may repeat steps S310-S330 every specific period of time and track each object. Then, the object detection device 100 may perform step S340 to determine the object status of each object, and then the object detection device 100 may perform step S350 to determine whether to enter the specific space based on the object information and the object status of each object.

Figure 4:
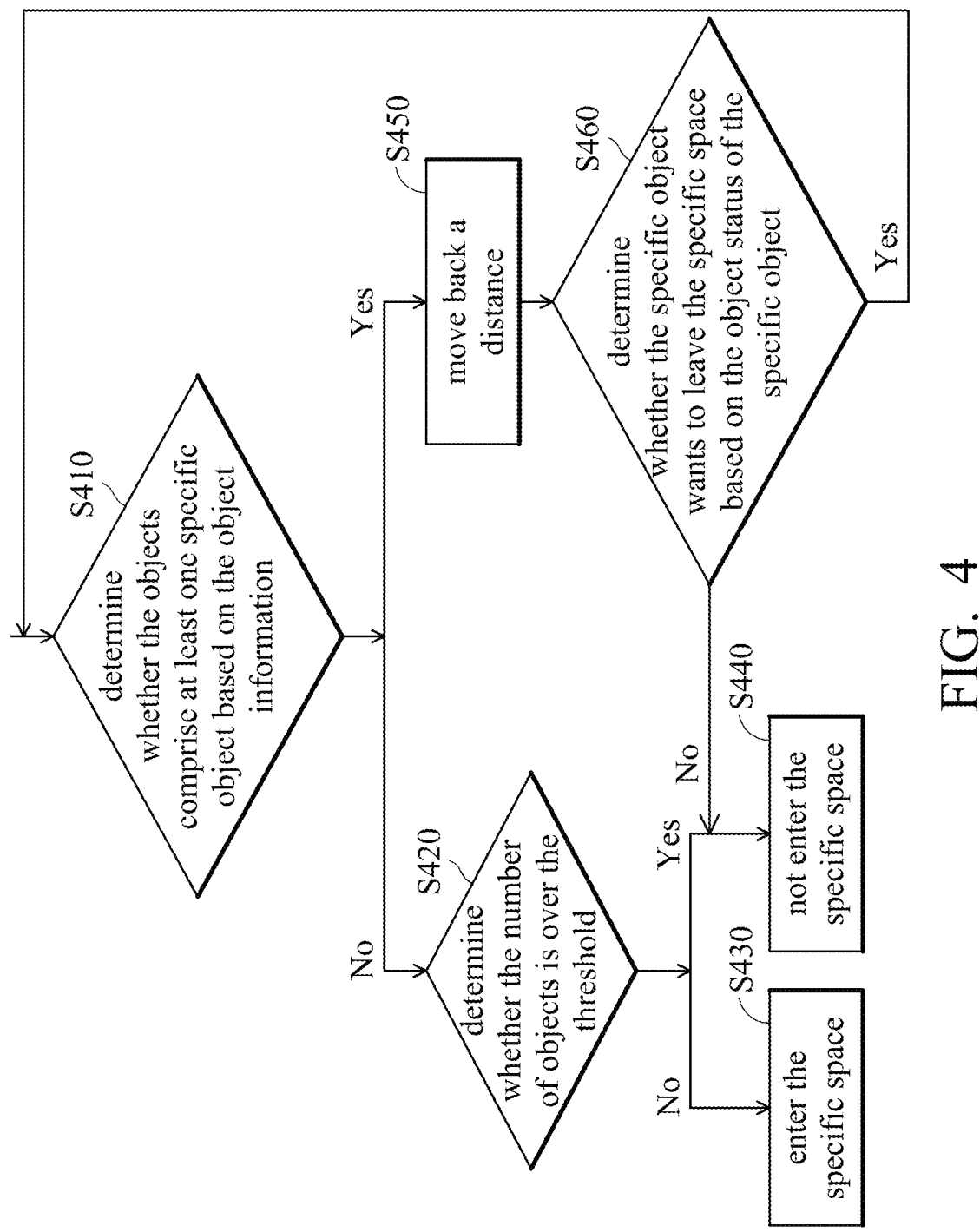
FIG. 4 is a flow chart illustrating the step S350 according to an embodiment of the invention.

FIG. 4 is a flow chart illustrating step S350 according to an embodiment of the invention. The flow of FIG. 4 can be applied to the object detection device 100. As shown in FIG. 4, in step S410, the object detection device 100 may determine whether the objects comprise at least one specific object based on the object information.

In response to that the objects do not comprise any specific object, step S420 is performed. In step S420, the object detection device 100 may determine whether the number of objects is over the threshold.

In response to that the number of objects is not over the threshold, step S430 is performed. In step S430, the object detection device 100 may determine to enter the specific space.

In response to that the number of objects is over the threshold, step S440 is performed. In step S440, the object detection device 100 may determine not to enter the specific space. After step S440, the object detection device 100 may perform the operations of FIG. 4 again in the next specific period of time. In addition, After step S440, the object detection device 100 may also perform the operations of FIG. 3 and FIG. 4 again after receiving the next signal indicating that the specific space (e.g., an elevator door) is opened In response to that the objects comprise the specific object, step S450 is performed. In step S450, the object detection device 100 may move back a distance (e.g., 1 meter) to let the specific object (e.g., wheelchair, stroller or cart) have enough space to leave the specific space (e.g., the elevator).

In step S460, the object detection device 100 may determine whether the specific object wants to leave the specific space based on the object status of the specific object. In response to that the object detection device 100 determines that the specific object wants to leave the specific space, the object detection device 100 may perform step S410 to restart the operations of FIG. 4 to continuously determine whether the specific object has left the specific space. In response to that the object detection device 100 determines that the specific object does not want to leave the specific space, the object detection device 100 may determine not to enter the specific space (i.e., perform step S440).

According to the object detection method provided in the invention, the object detection device will be able to determine a suitable time to enter the specific space (e.g., elevator).

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An object detection device, comprising:
   an image-extraction device, extracting a plurality of images and a plurality of depth images in a specific space, wherein each image corresponds to one of the plurality of depth images; and
   a processor, coupled to the image-extraction device, and obtaining the plurality of images and the plurality of depth images from the image-extraction device,
   wherein the processor detects objects in each image using an object detection model to obtain object information,
   wherein the processor calculates depth value of each object in each depth image,
   wherein the processor inputs the depth value of each object into an object status model to determine object status of each object,
   wherein the object detection device, via the processor, determines whether to enter the specific space based on the object information and the object status of each object,
   wherein the processor determines whether the objects comprise at least one specific object based on the object information, wherein the specific object is wheelchair, stroller or cart,
   wherein in response to the objects comprising the at least one specific object, the processor indicates the object detection device to move back, and determines whether the specific object leaves the specific space based on the object status of the specific object, and
   wherein in response to the specific object not leaving the specific space, the object detection device, via the processor, determines not to enter the specific space.

2. The object detection device of claim 1, wherein the object detection model is a You Only Look Once (YOLO) model or a Region Convolutional Neural Network (R-CNN) model.

3. The object detection device of claim 1, wherein the processor tracks the same objects in each image.

4. The object detection device of claim 1, wherein the processor calculates a depth matrix of each object in each depth image, puts depth values of the depth matrix in sequence, selects a specific range of the depth values from the sequence, and calculates an average of the selected depth values to obtain the depth value of each object in each depth image.

5. The object detection device of claim 1, wherein the object status model is a Recurrent Neural Network (RNN) model or a Long Short Term Memory (LSTM) model.

6. The object detection device of claim 1, wherein in response to the objects not comprising the at least one specific object, the processor determines that a number of the objects is over a threshold.

7. The object detection device of claim 6, wherein in response to the number of the objects being over the threshold, the processor indicates the object detection device not to enter the specific space, and in response to the number of the objects not being over the threshold, the processor indicates the object detection device to enter the specific space.

8. The object detection device of claim 1, further comprising:
   an infrared detection device, coupled to the processor and configured to determine whether there is any obstacle around the object detection device.

9. An object detection method, applied to an object detection device, comprising:
   extracting, by an image-extraction device of the object detection device, a plurality of images and a plurality of depth images in a specific space, wherein each image corresponds to one of the plurality of depth images;
   detecting, by a processor of the object detection device, objects in each image using an object detection model to obtain object information;

calculating, by the processor, depth value of each object in each depth image;

inputting, by the processor, the depth value of each object into an object status model to determine object status of each object; and determining, by the processor, whether to enter the specific space based on the object information and the object status of each object, wherein the method further comprises:

determining, by the processor, whether the objects comprise at least one specific object based on the object information, wherein the specific object is wheelchair, stroller or cart;

in response to the objects comprising the at least one specific object, indicating, by the processor, the object detection device to move back;

determining, by the processor, whether the specific object leaves the specific space based on the object status of the specific object; and wherein in response to the specific object not leaving the specific space, determining, by the processor, not to enter the specific space.

10. The object detection method of claim 9, wherein the object detection model is a You Only Look Once (YOLO) model or a Region Convolutional Neural Network (R-CNN) model.

11. The object detection method of claim 9, further comprising:

tracking, by the processor, the same objects in each image.

12. The object detection method of claim 9, further comprising:

calculating, by the processor, a depth matrix of each object in each depth image, putting, by the processor, depth values of the depth matrix in sequence;

selecting, by the processor, a specific range of the depth values from the sequence; and calculating, by the processor, an average of the selected depth values to obtain the depth value of each object in each depth image.

13. The object detection method of claim 9, wherein the object status model is a Recurrent Neural Network (RNN) model or a Long Short Term Memory (LSTM) model.

14. The object detection method of claim 9, further comprising:

in response to the objects not comprising the at least one specific object, determining, by the processor, a number of the objects is over a threshold.

15. The object detection method of claim 14, further comprising:

in response to the number of the objects being over the threshold, indicating, by the processor, the object detection device not to enter the specific space; and in response to the number of objects not being over the threshold, indicating, by the processor, the object detection device to enter the specific space.

16. The object detection method of claim 9, further comprising:

determining, by an infrared detection device of the object detection device, whether there is any obstacle around the object detection device.

* * * * *